Patented Mar. 14, 1939

2,150,205

UNITED STATES PATENT OFFICE 2,150,205

TREATMENT OF REGENERATED CELLULOSE

Paul Boyd Cochran, Parlin, N. J., Maurice Valentine Hitt, Wilmington, Del., and Leland Van Taylor, Raritan Township, Middlesex County, N. J., assignors to E. I. du Pont de Nemours & Company, Wilmington, Del., a corporation of Delaware No Drawing. Application April 15, 1937, Serial No. 137,150

4 Claims. (Cl. 92—20)

This invention relates to the purification of regenerated cellulose sheeting and more particularly to a process of treating such sheeting by which it may readily be used for a great many purposes.

The raw material of the process of the present invention is regenerated cellulose sheeting such as that sold under the trade name of "Cellophane". This product is manufactured by processes well known in the art which include extruding viscous solutions in the form of thin sheets into regenerating baths. The preparation of the raw material does not form a part of the present invention since the raw material may be prepared by almost any commercial process. Furthermore, it may have lacquer, waterproofing material, certain colors, and other ingredients on its surface.

In the preparation of rectangular sheets for wrapping packages, the regenerated cellulose with or without the water-proof or other coating is wound in large rolls. When the desired amount has been wound on to the roll, it is cut by means of a knife along one radius, thereby forming a large number of rectangular sheets. It will be apparent that those which were wound on the roll last will have a greater length than those which were first wound on the roll. In order to prepare sheets having the same size, all of them are cut to the same dimension as the smallest. This leaves a considerable waste. Heretofore, this material has been discarded and sometimes used for fuel.

An object of the present invention is the provision of a method of treating regenerated cellulose so that it may be used for the preparation of nitrocellulose as described in our prior Patent No. 1,997,766.

Another object of this invention is the provision of a simple and inexpensive method of purifying waste, regenerated cellulose so that a very pure form of cellulose is produced which may be used for any purpose for which cellulose, especially a highly purified cellulose, is ordinarily required. Other objects will be apparent as the description of the invention proceeds.

These objects are accomplished according to the present invention by reducing regenerated cellulose sheeting to the form of small crumpled pieces. This material is then washed and the impurities are separated and the pure regenerated cellulose is then dried.

The comminution may be carried out in a rotary cutter, hammer mill, stamp mill, shredder, or other mechanical device which will reduce it to the required fineness. It has been found that a particle size of less than $\frac{1}{16}$ to $\frac{3}{32}$ of an inch is satisfactory when the material is to be nitrated. A Ball and Jewell rotary cutter is particularly suitable for this purpose since the product is of the desired particle size and is usually curled or crinkled and as pointed out in the patent referred to, these crinkles add bulk to the product and practically eliminate the tendency of the particles to laminate and prevent uniform and complete nitration. The same property is desirable when the cellulose is to be used for other purposes. When very fine material is to be produced, it is sometimes desirable to carry out the comminution in two steps, when a hammer mill is used; the first stage reducing the particle size to about $\frac{3}{4}$ to $1\frac{1}{2}$ inch screen fineness, and the second step reducing the size to less than about $\frac{3}{32}$ of an inch. When a Ball and Jewell rotary cutter is used, fine material can be prepared in one step. For some purposes, larger sizes are particularly useful and the invention is not limited to any particular particle size provided the pieces are not too large to be treated as indicated below.

The comminuted sheeting is now discharged into tubs and is washed thoroughly with a dilute solution of sodium hydroxide. It has been found for most purposes that an 0.1% sodium hydroxide solution or the equivalent alkali based on the weight of the charge is satisfactory. The temperature of this slurry is preferably 40 to 45° C., although it will be apparent that higher or lower temperatures may be necessary in certain cases. Sodium hydroxide or other alkali is used in removing tenacious films which have been applied to the regenerated cellulose to make it moisture-proof or for other purposes. Where water-soluble ingredients have been used or where materials have been applied which separate easily from the sheeting, water alone without the alkali may be sufficient to remove the impurities. This washing treatment removes glycerine and also separates lacquer or waxes or other coatings which may be present and which accumulate on the surface of the washing liquid from which they may easily be removed.

The washing treatment is repeated several times to insure complete removal of any coating and the soluble constituents such as glycerine. The following table is given to illustrate a suitable series of steps for washing the finely divided cellulose sheeting in a removal tub although it will be understood that the apparatus, the number of washings, temperature of wash water, and duration of washing may be varied:

| | Minutes |
|---|---|
| Water containing 0.1% NaOH 40–50° C. | 25 |
| Agitate | 45 |
| Settle | 15 |
| Flood off coating | 25 |
| Drain | 30 |
| Warm water 40–50° C. | 25 |
| Agitate | 45 |
| Settle | 10 |
| Flood off coating | 10 |
| Drain | 30 |
| Warm water 40–50° C. | 25 |
| Agitate | 45 |
| Settle | 10 |
| Flood off coating | 10 |
| Drain | 30 |

The regenerated cellulose sheeting, now freed from extraneous materials, may be dried by any suitable means. A centrifuge may be used to remove the greater proportion of the water and the wet particles further dried by heating on a rotary steam tube drier, or the water slurry of the regenerated cellulose particles may be removed directly to a suitable filter drier, such as an "Oliver" filter, where a cake material is cast on the rotary drum and dried; e. g., to a moisture content of 0.5–5.0%, by means of warm air and an exhaust system. The temperature of the warm air or other drying apparatus is not critical, but obviously should not be sufficiently high to char or otherwise decompose the cellulose to the extent that discoloration takes place. Due to the irregular shape of the particles, the loss of regenerated cellulose through any screen perforations is very slight, the particles tending to bridge over the perforations rather than pass through them. The regenerated cellulose is now in suitable condition for the production of cellulose nitrate, or for other use requiring a very pure cellulose.

The material at this stage has a very pale straw color when seen as a mass although each individual particle may appear to be colorless. If it is desired to remove this faint remaining color, it may be done by bleaching solutions such as is ordinarily used for bleaching cellulose in the form of cotton or wood pulp. The usual hypochlorite or chlorine solutions are satisfactory. It has also been found that when the material is to be nitrated it may be bleached either before or after nitration. In this bleaching process, the regenerated cellulose is first treated with a solution of sodium hypochlorite or the equivalent containing about 1% available chlorine, although somewhat weaker or stronger amounts may be found better for certain purposes. The material is heated in the bath at a temperature of about 70° C. for 1½ to 2 hours. The solution is then drawn off and the charge given a wash with hot water. The water is drained and the charge subjected to a two-hour boil with a water solution of oxalic acid (approximately .04% based on the weight of the charge). This latter treatment is particularly for stabilizing the nitrocellulose. If the material is bleached before nitration, this oxalic acid treatment may be omitted provided the chlorine is thoroughly removed. Other bleaching agents such as peroxides or hypochlorites of sodium or calcium may be used as will be apparent to those skilled in the art.

In washing the waste regenerated cellulose scrap before treatment with the bleaching agent as indicated above, best results have been obtained when a relatively large volume of water is used. It has been found that not until about 25 to 30 parts of water are used with each part of waste scrap will best results be obtained. More water may be used without impairing the efficiency of the removal of impurities although a dilution much greater than that indicated above is uneconomical. In some cases, it is preferable to treat the material with fresh baths repeatedly.

The material produced according to this invention is a highly purified form of cellulose and has no taste, odor, or other traces of impurities present.

It is apparent that many widely different embodiments of this invention may be made without departing from the spirit and scope thereof; and, therefore, it is not intended to be limited except as indicated in the appended claims.

We claim:
1. The process for the manufacture of a cellulosic bulking agent comprising the steps of comminuting regenerated cellulose scrap, treating said comminuted cellulose to remove impurities and drying the so treated cellulose at a temperature below which cellulosic decomposition products are formed.

2. The process for the manufacture of a non-fibrous comminuted form of cellulose which comprises the steps of comminuting regenerated cellulose scrap for use as a bulking agent in the presence of an inert gas, freeing said cellulose from impurities, and drying the comminuted cellulose at a temperature below which cellulose decomposition products are formed.

3. The process for the manufacture of a cellulosic bulking agent comprising the steps of comminuting regenerated cellulose, bleaching said regenerated cellulose, treating said comminuted cellulose to remove impurities and drying the so treated cellulose at a temperature below which cellulosic decomposition products are formed.

4. The process for the manufacture of non-fibrous cellulose bulking agent of high purity from regenerated cellulose which comprises reducing the cellulose to a slurry free from impurities, concentrating said slurry, and drying the cellulose.

PAUL BOYD COCHRAN.
MAURICE V. HITT.
LELAND VAN TAYLOR.